United States Patent [19]
Stephens et al.

[11] Patent Number: 4,974,962
[45] Date of Patent: Dec. 4, 1990

[54] OPTO-ELECTRONIC SCALE-READING APPARATUS

[75] Inventors: W. F. N. Stephens, Badminton; F. E. R. Cannings, Cheltenham, both of United Kingdom

[73] Assignee: Renishaw PLC, Gloucestershire, United Kingdom

[21] Appl. No.: 188,552

[22] PCT Filed: Jul. 3, 1987

[86] PCT No.: PCT/GB87/00471
§ 371 Date: May 2, 1988
§ 102(e) Date: May 2, 1988

[87] PCT Pub. No.: WO88/00332
PCT Pub. Date: Jan. 14, 1988

[30] Foreign Application Priority Data
Jul. 3, 1986 [GB] United Kingdom ............... 8616240

[51] Int. Cl.$^5$ .................................... G01B 9/02
[52] U.S. Cl. ................... 356/356; 250/237 G
[58] Field of Search ............... 356/356, 374; 250/237 G

[56] References Cited
U.S. PATENT DOCUMENTS 2,796,498  3/1974  Post ........................ 356/374
3,344,700  10/1967  Brake .
4,677,293  6/1987  Michel ..................... 356/374 X

FOREIGN PATENT DOCUMENTS 0160811  11/1985  European Pat. Off. .
2405341  8/1975  Fed. Rep. of Germany .
917058  10/1961  United Kingdom .
932481  7/1963  United Kingdom .
1516536  7/1978  United Kingdom .

OTHER PUBLICATIONS

"Diffraction Gratings" M. C. Hutley, Academic Press, pp. 76–79, 1982.
"Interference Generated Moire Fringes in a System of Three Reflection Gratings," Optical Technology, vol. 38, No. 10, Oct. 1971.
Whitefield "Externally Sensed Grating Track Sensing Arrangement", IBM Tech. Discl. Bull, vol. 27, No.-1A, pp. 150–152, 6/84.

Primary Examiner—Davis L. Willis
Assistant Examiner—Matthew W. Koren
Attorney, Agent, or Firm—Spencer & Frank

[57] ABSTRACT

An opto-electronic scale-reading apparatus comprising a read head and a scale supported for displacement relative to each other for the incremental reading of marks provided on the scale. The read head includes a light source for producing light rays incident on the scale, an index grating for diffracting readable rays into fringes in at least one order of diffracton, and an analyzer grating for converting the fringes into light modulations at a rate which is a function of the rate of displacement between the read head and the scale. The scale comprises an elongate member having marks spaced in the direction of its length and spaces defined between the marks. The marks and spaces are defined by respective first and second surfaces of surface portions of the members, the first surfaces laying at an angle to adjacent second surfaces so that incident rays are reflected by the first surfaces in a first direction to be readable by the read head in the first direction. The incident rays are reflected by the second surfaces in a second direction such that rays reflected in the second direction are substantially not readable in the first direction.

27 Claims, 3 Drawing Sheets

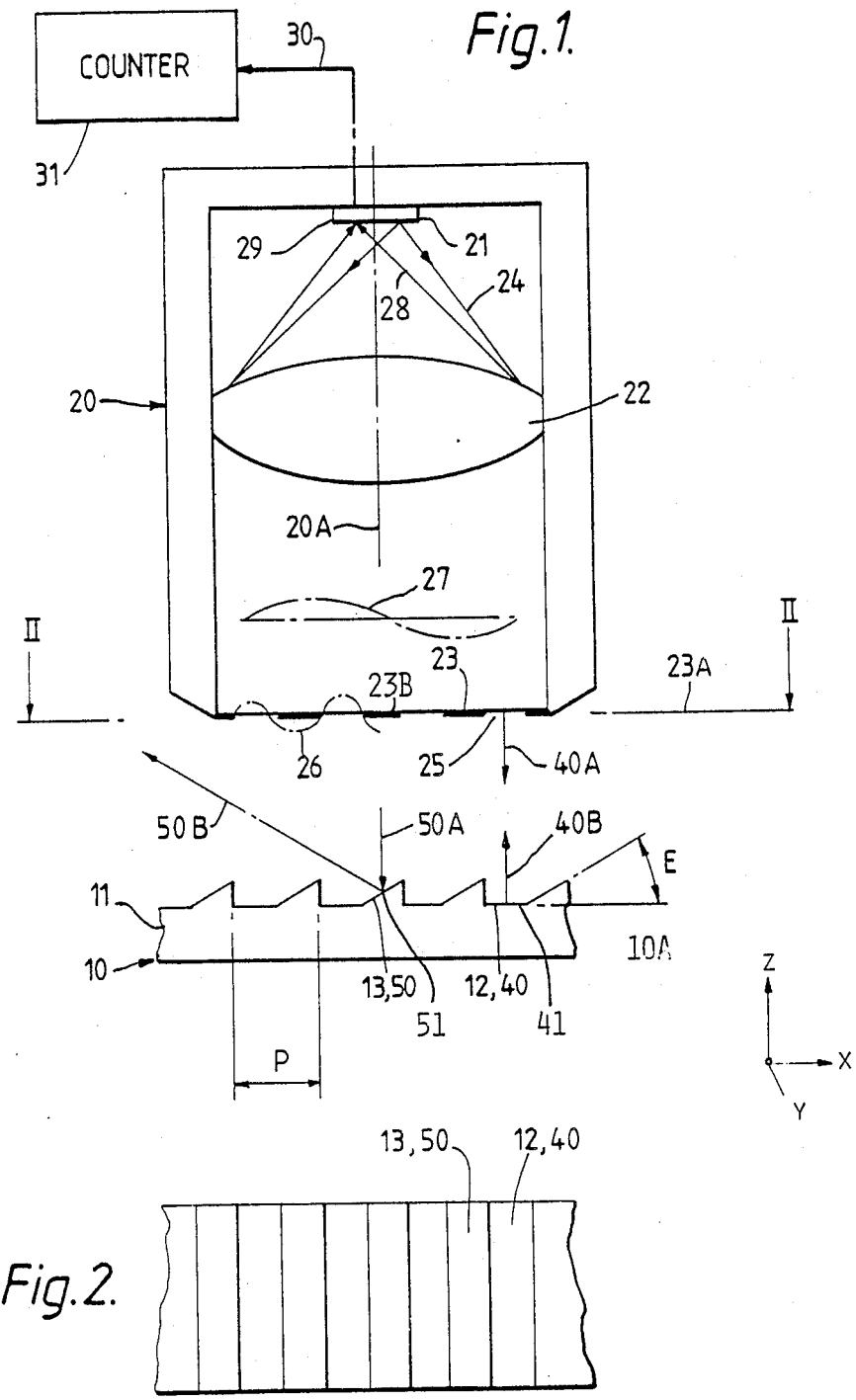

OPTO-ELECTRONIC SCALE-READING APPARATUS

BACKGROUND OF THE INVENTION

This invention relates to opto-electronic scale-reading apparatus of the kind wherein a read head and a scale are supported for movement one relative to the other for the incremental reading of marks provided on the scale, the scale is illuminated by incident light, the read head is arranged to view the scale in a given direction, and the scale comprises an elongate member having said marks spaced in the direction of the length thereof, spaces being defined between the marks.

GB-932,481 discusses the difficulty of providing good contrast between the marks and spaces at a metallic surface and describes a scale wherein such contrast is sought to be achieved by marks having highly reflective surfaces and spaces having diffusively reflective surfaces. However, the marks are applied to a flat surface of the scale member by a photo-resist process so that both the marks and the spaces have parallel surfaces and act as if they are substantially co-planar. This can still lead to difficulties in providing good contrast especially if the scale surface is contaminated.

GB-1,516,536 discusses the difficulty of contamination of the scale and describes apparatus wherein both the marks and the spaces are illuminated by diffuse light. However, such diffuse illumination necessarily reduces contrast, and contamination can reduce the contrast between the marks and the spaces still further because the marks and spaces would be at parallel substantially co-planar surfaces.

EP-0160811 describes a diffraction grating having regions of different periodicities with a view to forming diffraction fringes in correspondingly different positions. The different fringes define coded reference marks in an incremental opto-electronic scale-reading apparatus. The grating is a phase grating formed by a square or by a sawtooth profile illuminated by coherent light but the grating lines extend in the direction of the length of the incremental scale and do not themselves form the basis for an incremental count of position.

SUMMARY OF THE INVENTION

It is an object of the present invention to provide in an opto-electronic scale-reading apparatus a scale having improved optical contrast between the marks and the spaces especially where the marks and spaces are defined at a metallic surface.

More specifically, an opto-electronic scale-reading apparatus is provided which comprises a read head and a scale supported for displacement relative to each other for the incremental reading of marks provided on the scale. The read head includes a light source for producing light rays incident on the scale, an index grating for diffracting readable rays into fringes in at least one order of diffraction, and an analyzer grating for converting the fringes into light modulations at a rate which is a function of the rate of displacement between the read head and the scale.

The scale comprises an elongate member having marks spaced in the direction of its length and spaces defined between the marks. The marks and spaces are defined by respective first and second surfaces of surface portions of the members, the first surfaces lying at an angle to adjacent second surfaces so that incident rays are reflected by the first surfaces in a first direction to be readable by the read head in the first direction. The incident rays are reflected by the second surfaces in a second direction such that rays reflected in the second direction are substantially not readable in the first direction.

BRIEF DESCRIPTION OF THE DRAWINGS

Embodiments of this invention will now be described with reference to the accompanying drawings wherein:

FIG. 1 is a sectional elevation of a first example of a scale-reading apparatus and shows a first example of a scale.

FIG. 2 is a view on the line II—II in FIG. 1.

DESCRIPTION OF THE PREFERRED EMBODIMENTS

Figure 3:
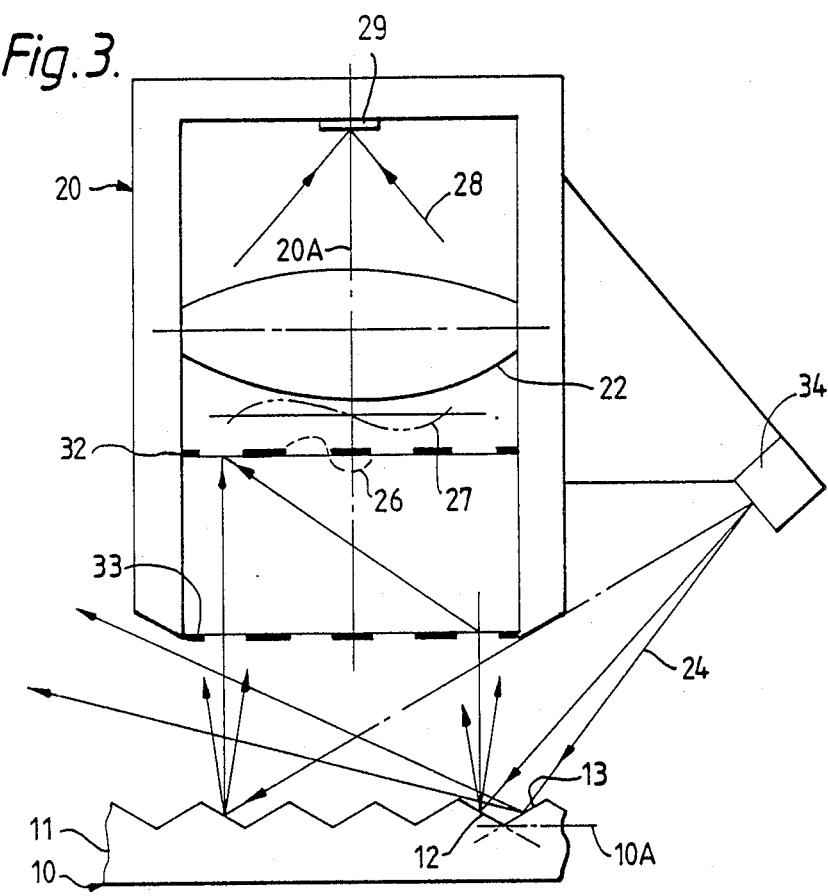
FIG. 3 is a sectional elevation of a second example of a scale-reading apparatus also shows a second example of a scale.

In FIG. 1, the scale, 10, comprises an elongate scale member 11 having marks 12 and spaces 13 provided thereon alternately along the length of the member 11. A read head 20 includes a point source 21 for incident light rays 24. The source 21 is positioned to illuminate the scale 10 through the intermediary of a collimating lens 22 and a transmissive grating 23. The read head 20 and the scale 10 are supported for relative movement in the direction of the length of the scale, i.e. the direction of the spacing of the marks 12, in a manner known per se. The grating 23 divides the incident light into individual light sources 25. The scale 10 constitutes a reflective diffraction grating which diffracts the light from the sources 25 in at least one order of diffraction and so as to produce diffraction fringes 26. The spacing between the scale 10 and the grating 23 is such that the fringes 26 occur in the plane 23A of the grating 23. The grating 23 cooperates to generate, at its side remote from the scale, light modulations 27 at the same rate as that at which the marks 12 pass the read head 20 during its movement relative to the scale 10. The lens 22 focusses the reflected and modulated light, 28, onto an opto-electronic transducer 29 which generates corresponding electric signals 30. An incremental or decremental count of the signals 30 at a counter 31 provides a measure of the relative position of the read head 20 and the scale 10 during their relative movement.

The apparatus is further described with reference to the orthogonal directions X, Y, Z. The scale 10 is elongate in the X-direction, the marks 12 and the lines, 23B, of the grating 23 are elongate in the Y-direction (FIG. 2). The scale 10 has a reference plane 10A including the X and Y-directions. The read head 20 has an optical axis 20A lying generally in a plane including the X and Z-directions but may, as shown, extend only in the Z-direction. The axis 20A defines the reading direction of the read head 20.

The marks 12 are defined by first surfaces 40 which lie parallel to the plane 10A of the scale 10, i.e. the axis 20A is normal to the surfaces 40. The surfaces 40 are provided at portions 41 of the member 11. The spaces 13 are defined by surfaces 50 formed by portions 51 of the member 11. The portions 51 have a sawtooth profile extending out of the plane 10A. The surfaces 50 are inclined relative to the surfaces 40 and relative to the plane 10A at an angle E of e.g. 30°. It will be clear that incident light from the sources 25 falling onto the surfaces 40 is substantially reflected by the surfaces 40 back to the grating 23 as shown by rays 40A,40B. Thus the surfaces 40 can participate in the diffraction mechanism. Distinct from that, an incident ray 50A falling onto the surfaces 50 is reflected, by virtue of the inclination of these surfaces, in a direction away from the read head 20 as shown by a ray 50B, and diffraction at these surfaces would not produce orders readable by the head 20. If any of the rays 40B are reflected back from the grating 23 onto the surfaces 50, they will be deflected by the surfaces 50 at least substantially away from the grating 23 and will not substantially diminish the contrast between the marks 12 and the spaces 13 as far as the read head 20 is concerned. The surfaces 40,50 are preferably specular.

A typical pitch P for the scale described with reference to FIG. 1 is a 0.020 mm, use being make of infrared for the incident light. Since the scale has to be of diffraction quality the tolerance for the position of the marks has to be accordingly fine. See "Diffraction Gratings" by M C Hutley published 1982 by Academic Press, London, page 76.

In FIG. 3, the apparatus is similar to that shown in FIG. 1 (like parts being given like reference numerals in both FIGURES) except as follows. The read head 20 is provided with two gratings 32,33. A light source 34, of infrared or white light, is positioned to direct divergent incident rays 24 onto the scale 10 from a position outside the optical path through the gratings 32,33 and obliquely to the plane 10A. In this example, it is the scale 10 which produces the individual light sources 25. The grating 32 generates the fringes 26, the grating 33 generates the light modulations 27, and the lens 22 collects the modulated light 28 for focussing onto the transducer 29. Such an arrangement of gratings, constitutes a spatial filter as described in WO 86/03833. That is, the read head is relatively unaffected if the marks 12 are not of diffraction quality and a wider tolerance can be accepted regarding position, periodicity or surface finish of the marks compared to the tolerance mentioned in connection with FIG. 1. Also, the filter has a useful tolerance to the marks by being diffusely reflective as by variation in the surface shape or surface finish of the marks. This can be of advantage because such diffuse reflectivity allows a relaxation of tolerances in the relative position of the read head and the scale about axes lying in the Y or in the X-direction.

Figure 4:
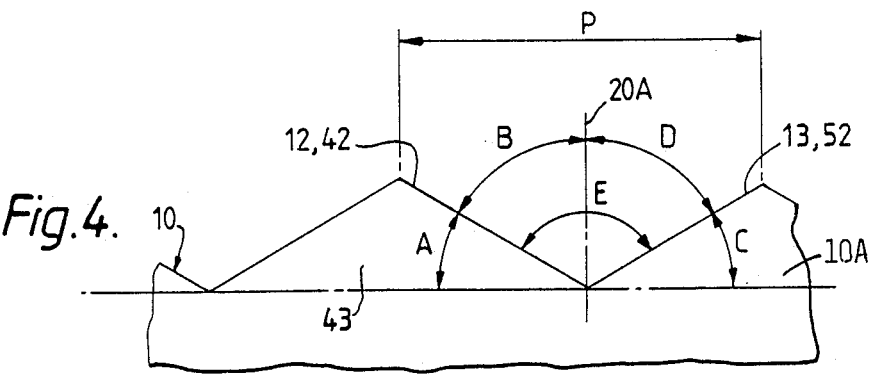
FIG. 4 is an enlarged detail of FIG. 3.

Referring now also to FIG. 4, the marks 12 are defined by first surfaces 42 which lie at an angle A (FIG. 4) to the reference plane 10A and at a complementary angle B to the axis 20A. The spaces 13 are defined by surfaces 52 which lie at an angle C to the plane 10A and at a complementary angle D to the axis 20A. Thus the surfaces 42,52 form two sides, at an angle E, of a triangle, the third side of which is notionally formed by the plane 10A. In other words the surfaces 42,52 are jointly formed by a portion 43 of the member 11 having a triangular profile extending out of the plane 10A. By virtue of the angles A, B the surfaces 42 reflect the incident light 24 toward the read head 20. In other words the angles A, B are such that the light is readable by the grating 32 by reflection at the surfaces 40, and the angles C, D are such that the incident light 24 is deflected away from the read head and is therefore not readable by the grating 32.

In view of the tolerances mentioned there may be irregularities in the pitch P of the surfaces 42 or in the height of the surfaces 42 above the plane 10A. Also the surfaces 42 may have a surface finish rendering reflection from them non-specular although a specular finish may be desirable for optical efficiency. However, the surfaces 52 may be of specular finish to avoid stray reflections in the direction of the read head, i.e. in the Z direction. Regarding back reflection from the grating 32 it will be seen that such reflection is diverted both by the surfaces 42 and 52 away from the read head 20. The angles A, C may each be 30°.

Figure 5:
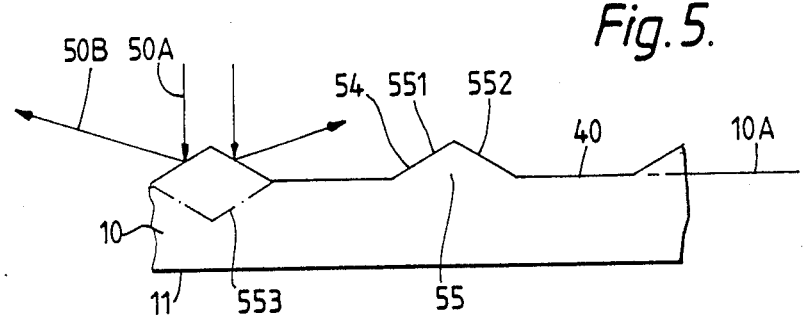
FIG. 5 shows the profile of a third example of a scale.

FIG. 5 shows a scale 10 suitable for use with the read head 20 shown in FIG. 1 and having second surfaces 54 formed by a triangular projection 55 from the plane 10A i.e. the plane of the first surfaces 40, the second surface 54 being formed by the two sides or facets 551,552 of the projection 55. In a modification shown in broken lines, the second surfaces are formed by a recess 553 out of the plane 10A.

Figure 6:
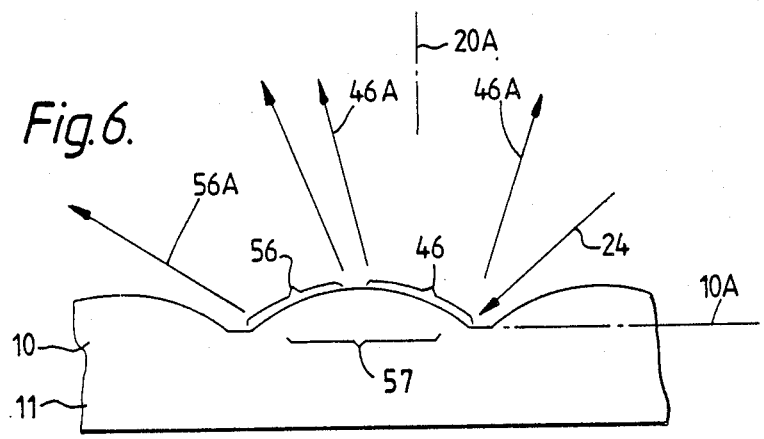
FIG. 6 shows the profile of a fourth example of a scale.

FIG. 6 shows a scale 10 suitable for the read head 20 shown in FIG. 3 and having first surfaces 46 and second surfaces 56 wherein each pair of the first and second surfaces 46,56 is formed by respective sides of a common projection 57 of the member 11 out of the reference plane 10A. As shown, the first surfaces reflect incident rays 24 as rays 46A substantially toward the read head i.e. in the direction of the axis 20A while the second surfaces 56 reflect the incident rays as rays 56A away from the axis 20A.

Figure 7:
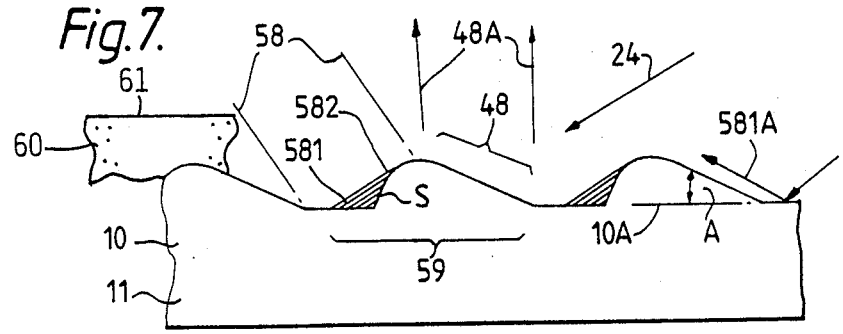
FIG. 7 shows the profile of a fifth example of a scale.

FIG. 7 shows a scale 10 suitable for oblique illumination as shown in FIG. 3 and having first and second surfaces 48,58 formed by common portions 59 of the member 11. The surfaces 48 are inclined to the reference plane 10A to reflect incident rays 24 as rays 48A toward the read head. The second surfaces 58 are formed by facets 581,582 which define a recess out of the direction of the incident rays 24 so that the facets 581,582 are in shadow, denoted S, and no light is receivable therefrom by the read head 20. The facets 582 are at least partially curved as shown. The facets 581 lie in the plane 10A and insofar as they do not lie in the shadow they reflect the oblique rays 24 away from the read head as shown at 581A. The profile shown in FIG. 7 is a composite of planar and rounded surfaces and shows the flexibility available in the design of a particular profile. The angle A between the surfaces 48 and the reference plane may have a tolerance of ±0.5°.

Any one of the scales described may be provided with a transparent plastics coating, e.g. an acrylic plastics, 60 as shown in FIG. 7 to protect the profile of the first and second surfaces. The coating has a flat outer surface 61. When designing the profile account has to be taken of refraction at the surface 61. Inasmuch as it is desired to avoid ordered diffraction to benefit from relaxation of tolerance as mentioned in connection with FIG. 3, a required degree of diffusion can be introduced by the appropriate choice of the plastics material.

Generally, it will be seen that in any of the scale profiles described the angular relationship between the first and second surfaces operates to provide optical distinction, i.e. contrast, between the marks and spaces. Further, the first and second surfaces can be formed in the same material, i.e. there is no need to apply separate material to a substrate to establish the marks. The pitch of the marks may be in the order of 20 micron and a typical angle between the plane 10A and the first or second surfaces is in the range 25° to 35°, but basically, the angle E between the first and second surface need only be large enough to ensure that the read head does not read reflection or diffraction from the second surface.

I claim:

1. Opto-electronic scale-reading apparatus comprising a read head and a scale supported for displacement one relative to the other for the incremental reading of marks provided on the scale, the read head including a light source adapted to produce light rays incident on the scale, the read head being arranged to read the scale in a first direction; the scale comprising an elongate member having marks spaced in the direction of the length thereof and spaces defined between the marks, the marks and spaces being defined by respective first and second surfaces of surface portions of the member, wherein any first surface lies at an angle to an adjacent said second surface so that, in operation, the incident rays are reflected by the first surfaces substantially in said first direction to be readable by said read head, and the incident rays are reflected by the second surfaces in a second direction such that rays reflected in the second direction are substantially not readable in the first direction; and
wherein said read head comprises an index grating for diffracting the readable rays into fringes in at least one order of diffraction, and an analyzer grating for converting the fringes into light modulations at a rate which is a function of the rate of displacement between the read head and the scale.

2. Opto-electronic scale-reading apparatus comprising a read head and a scale supported for movement one relative to the other for the incremental reading of marks providing on the scale, the read head including a light source adapted to produce light rays incident on the scale, the read head being arranged to read the scale in a given direction;
the scale comprising an elongate member having marks spaced in the direction of the length thereof and spaces defined between the marks, wherein the marks and spaces are defined by respective first and second surfaces of surface portions of the member, wherein any first surface lies at an angle to an adjacent said second surface so that, in operation, the incident rays are reflected by the first surfaces so as to be readable in said given direction, and the second surfaces are at least partially shadowed by said surface portions so that the second surfaces are substantially not readable in said given direction; and
wherein said read head comprises an index grating for diffracting the readable rays into fringes in at least one order of diffraction, and an analyzer grating for converting the fringes into light modulations at a rate which is a function of the rate of displacement between the read head and the scale.

3. Opto-electronic scale-reading apparatus comprising a member provided with a first periodic structure defining a scale, a read head provided with a second and a third periodic structure, and a light source for illuminating the scale;
the scale being adapted for directing light incident thereon toward the read head, the first and second periodic structures cooperating optically to generate a fringe pattern at the third periodic structure, the scale and the read head being supportable for relative movement in the direction of the periodicity of the first periodic structure and consequential relative movement between the fringe pattern and the third periodic structure enabling determination of the extent of relative movement between the scale and the read head;
wherein the first periodic structure is defined by alternate first and second surfaces provided on said member and of which any first surface lies at an angle to an adjacent said second surface so that the light incident on the scale is directed toward the read head only by said first surfaces.

4. Apparatus according to claim 3, wherein the first surfaces lie substantially in a common plane, and the second surfaces are inclined to the first surfaces.

5. Apparatus according to claim 4, wherein the second surfaces are formed by surface portions, said surface portions being projections or recesses of the member relative to said common plane.

6. Apparatus according to claim 3, wherein the first surfaces are inclined to a reference plane and the second surfaces are inclined to the reference plane in a sense opposite to that in which the first surfaces are inclined.

7. Apparatus according to claim 3, wherein at least one of the first and second surfaces is curved.

8. Apparatus according to claim 3, wherein each pair of the first and second surfaces is defined by respective sides of a common projection or recess of the member relative to a reference plane.

9. Apparatus according to claim 3 wherein said second surfaces are positioned to direct the incident light away from the read head.

10. Apparatus according to claim 3 wherein said member has surface portions on each of which a said first and a said second surface is defined, and said light source and said surface portions are so arranged that said surfaces lie at least partially in shadows cast by said surface portions.

11. Apparatus according to claim 3, wherein said second and third periodic structures are arranged for light from said light source to interact in succession with said second, first and third periodic structures.

12. Apparatus according to claim 11, wherein said second and third periodic structures are defined by a single grating situated between said light source and said scale.

13. Apparatus according to claim 11, wherein said first periodic structure has a two-dimensional extent in a reference plane, said second periodic structure is arranged for light interacting therewith to pass therefrom toward the first periodic structure in a mean direction normal to said reference plane, and said first surfaces of the scale are reflective surfaces lying in a plane parallel to said reference plane.

14. Apparatus according to claim 3, wherein said second and third periodic structures are arranged for light from said source to interact in succession with said first, second and third periodic structures.

15. Apparatus according to claim 14, wherein said first periodic structure has a two-dimensional extent in a reference plane, said light source is arranged for light therefrom to be incident on the first periodic structure in a mean direction at an angle oblique to said reference plane, said first surfaces lying at an angle to said reference plane such as to reflect the light toward the read head.

16. Apparatus according to claim 15 wherein said second surfaces lie at an angle to said reference plane such as to reflect the light away from the read head.

17. Apparatus according to claim 14, wherein said first periodic structure is not of diffraction quality.

18. Apparatus according to claim 14 wherein said first periodic structure is adapted for light interacting with at least said first surfaces to be diffused by such interaction.

19. Apparatus according to claim 3, said relative movement between the fringe pattern and the third periodic structure causing the fringes of said fringe pattern to generate light intensity modulations at the side of the third periodic structure remote from the first and second periodic structures, and the apparatus comprising an opto-electronic transducer and a focussing means for focussing the modulations pertaining to the respective fringes of said pattern on to said transducer thereby to produce a signal representing the sum of the intensities of the individual modulations.

20. Apparatus according to claim 3, comprising a layer of a substantially transparent material covering said first and second surfaces, the surfaces of the layer remote from said first and second surfaces being substantially flat.

21. Apparatus according to claim 20 wherein said material has the property of partially diffusing the light interacting with said first periodic structure.

22. Apparatus according to claim 3, wherein said first periodic structure has two-dimensional extent in a reference plane, and one of said first and second surfaces are parallel to said reference plane.

23. Apparatus according to claim 3, wherein said first periodic structure has two-dimensional extent in a reference plane and said first surfaces are parallel to said reference plane.

24. Apparatus according to claim 3, wherein said first periodic structure has two-dimensional extent in a reference plane and said second surfaces are parallel to said reference plane.

25. Apparatus according to claim 3, wherein said first periodic structure has two-dimensional extent in a reference plane, said first surfaces are parallel to said reference plane, the light between said light source and said read head has an incident path to, and a reflected path from, said first surfaces, and wherein the relative position of said light source and said read head is such that one of said paths is at an angle normal to said reference plane.

26. Apparatus according to claim 3, wherein said first periodic structure has two-dimensional extent in a reference plane, said first surfaces are at an angle oblique to said reference plane, the light between said light source and said read head has an incident path to, and a reflective path from said first surfaces, and wherein the relative position of said light source and said read head is such that one of said paths is normal to said reference plane.

27. Apparatus according to claim 3, wherein said first periodic structure has two-dimensional extent in a reference plane, said first surfaces lie at an angle oblique to said reference plane, said second surfaces lie at an angle oblique to said reference plane in a sense opposite to that of the first surfaces, and wherein the arrangement of said light source is such that light therefrom has a path substantially parallel to said second surfaces.

* * * * *